United States Patent [19]

Izumitani et al.

[11] Patent Number: 4,549,895
[45] Date of Patent: Oct. 29, 1985

[54] METHOD AND APPARATUS FOR MELTING GLASS

[75] Inventors: Tetsuro Izumitani, Tokyo; Toshi Takajoh, Saitama; Iwao Kinjo, Tokyo, all of Japan

[73] Assignee: Hoya Corporation, Tokyo, Japan

[21] Appl. No.: 413,318

[22] Filed: Aug. 31, 1982

[30] Foreign Application Priority Data

Sep. 3, 1981 [JP] Japan .................. 56-137713
Sep. 3, 1981 [JP] Japan .................. 56-137712

[51] Int. Cl.[4] .................................. C03B 5/04
[52] U.S. Cl. .............................. 65/134; 65/340
[58] Field of Search ............ 65/29, 128, 129, 340, 65/164, 134

[56] References Cited

U.S. PATENT DOCUMENTS

| | | | |
|---|---|---|---|
| 1,166,125 | 12/1915 | Frink | 65/340 |
| 1,680,543 | 8/1928 | Howard | 65/128 |
| 2,169,611 | 8/1939 | McIntyre et al. | 65/340 |
| 2,186,718 | 1/1940 | Ferguson | 65/128 |
| 3,244,495 | 4/1966 | Apple et al. | 65/134 |
| 3,897,232 | 7/1975 | Groves | 65/29 |
| 4,011,070 | 3/1977 | Hynd | 65/29 |
| 4,023,950 | 5/1977 | Glaser | 65/29 |

*Primary Examiner*—S. Leon Bashore
*Assistant Examiner*—Michael K. Boyer
*Attorney, Agent, or Firm*—Sughrue, Mion, Zinn, Macpeak, and Seas

[57] ABSTRACT

A glass melting apparatus is provided with a melting tank, a refining tank and a working tank wherein the melting tank is operatively connected to the refining tank by a temperature control connecting pipe for intermittently supplying molten glass from the melting tank to the refining tank in dependence upon the level of molten glass within the refining tank. The melting tank may be comprised of a single tank which is considerably larger than the refining tank and the working tank or may be comprised of a plurality of individual, movable tanks each of which may be brought into operative association with the refining tank for melting raw material in the melting tank, the molten glass being supplied to the refining tank and continuously treated and supplied to the working tank.

4 Claims, 4 Drawing Figures

METHOD AND APPARATUS FOR MELTING GLASS

BACKGROUND OF THE INVENTION

The present invention is directed to a method and apparatus for melting glass and more particularly to a method and apparatus for the production of optical glass having a reduced variation in the refractive index.

In general, during the continuous production of a small amount of glass such as optical glass, a raw material is first melted in a melting tank to form the molten glass having a uniform refractive index. The molten glass is first transferred to a refining tank and bubbles and striae are removed and is then transferred to a working tank where the temperature of the molten glass is adjusted to a suitable level for the flow of the glass through an outlet. In this way, the melting tank, the refining tank and the working tank are separated from each other and connected by a connecting pipe so tnat the molten glass in each tank does not mix with the molten glass in another tank thereby increasing the production efficiency.

In the prior art system shown in FIG. 1, the melting tank 1, the refining tank 3 and the working tank 4 are connected to each other by connecting pipes 11 and 12. The raw material is continuously fed to the melting tank 1 where it is melted to form molten glass. The molten glass is transferred to the refining tank 3 which is provided with a stirring means where the bubbles and striae are removed. The molten glass is then sent to the working tank 4 which is also provided with a stirring means 13 in which the molten glass is completely freed of striae and at the same time is regulated to the proper temperature for subsequent flow through the outlet pipe 5. While the refractive index of the molten glass in the melting tank can be made uniform or homogenized over a sufficient period of time, there is an unevenness in the raw materials being placed in the melting tank during a continuous feed arrangement so that the refractive indices of the glass products obtained will be uneven or different due to the different raw materials.

Another prior art method involves the intermittent or batch production of glass wherein the raw material is placed in a crucible and melted to form molten glass. The homogenization of the refractive index of the molten glass, the removal of bubbles and striae and the regulation of the temperature to a suitable level for outflow are carried out successively in the same crucible.

Of the above-described conventional prior art melting methods, the continuous melting method is advantageous in that the production efficiency is very high since all of the tanks are separated from each other and the molten glass in each tank is prevented from mixing with the molten glass of another tank. However, because of the serious variations in the refractive index due to changes in the composition of the raw material, some of the glass produced by this system cannot be used as optical glass. On the other hand, in the case of the intermittent or batch method, the production efficiency is low even though the uniformity of the refractive index is assured. This leads to an increase in production costs. Furthermore, in the case of special glass, a tank made of an expensive metal, such as platinum or a platinum alloy, is often used which further increases the cost.

SUMMARY OF THE INVENTION

The method and apparatus for melting glass according to the present invention provides a new and improved system which increases the production efficiency while ensuring the uniformity of the refractive index in the glass being produced.

The method and apparatus for melting glass according to the present invention overcomes the problems associated with the prior art systems by making the volume of the melting tank much larger than the volumes of the refining tank and the working tank and melting the raw material in the melting tank by an intermittent process while performing the subsequent procedures in the refining tank and the working tank by a continuous production process. In this way, the variations in the refractive index are reduced and the refractive index can be controlled accurately within a predetermined range. In order to control the lever of molten glass in the refining tank, these tanks are connected to each other by a connecting pipe which is surrounded by a heating-cooling member. By regulating the heating-cooling member depending on the surface level of the molten glass in the refining tank, the introduction of the molten glass from the melting tank into the refining tank can be started and stopped. In general, when a raw material is continuously supplied, the change in refractive index is caused by a change in the composition of the raw material. In the method according to the present invention, the volume of the melting tank is sufficiently larger than that of the other tanks and the introduction of the raw material from the melting tank to the refining tank is performed intermittently. In this way, the refractive index can be made uniform in the melting tank and can be more accurately controlled. Since the melting tank serves only to melt the raw material to form a molten glass and to make the refractive index uniform, it is not necessary for the melting tank to be made of platinum or a platinum alloy. If, therefore, the melting tank is made of the usual refractory material, it can be produced inexpensively even though it has a large volume and it is possible to effect heating by the use of a relatively low cost burner. Furthermore, an electrode is installed near the bottom portion of the melting tank so that the temperature can be maintained at a stable constant level irrespective of the amount of glass in the tank. Furthermore, since the refining tank and any other subsequent tanks or the like are connected to each other by a connecting pipe and separated so that the molten glass in one tank does not mix with the molten glass in another tank, the production efficiency is increased and the desired glass product can be produced inexpensively.

The present invention also provides a new and improved glass melting apparatus which is comprised of at least two melting tanks which can be separately moved into and out of operative relation relative to the refining tank. In this way, the raw material may be melted in a plurality of melting tanks to form molten glass and to render the refractive index uniform. After the molten glass in the first melting tank is transferred to the refining tank, the first melting tank is exchanged with a second melting tank which then can supply molten glass to the refining tank. In this way, the time required for the exchange of glass material can be greatly shortened. In order to control the flow of molten glass from each of the melting tanks to the refining tank, a connecting pipe is provided in communication with the bottom of each melting tank at one end with the other end of each connecting pipe being adapted to be moved into closely spaced relation with the surface of the molten glass in the refining tank. Heating-cooling means can be associated with each connecting pipe to control the flow of molten glass from each melting tank to the refining tank.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
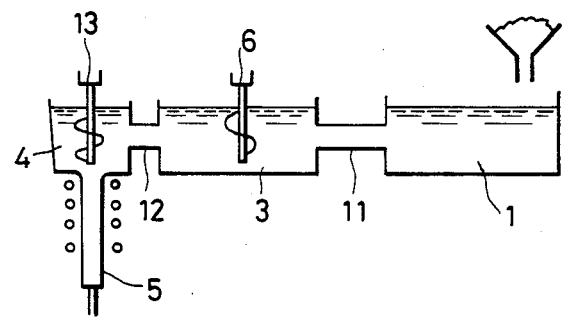
FIG. 1 is a schematic cross-sectional view of a melting apparatus utilizing a conventional prior art continuous process.
Figure 2:
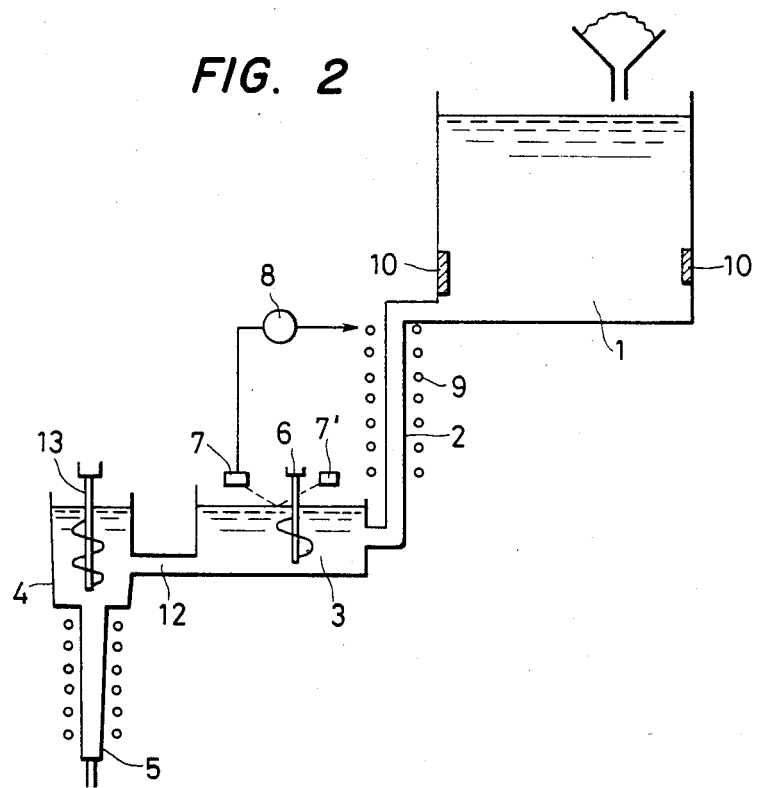
FIG. 2 is a cross-sectional schematic view of a first embodiment of the apparatus for carrying out the method according to the present invention.

The apparatus shown in the embodiment of FIG. 2 is comprised of a melting tank 1 made of a refractory material, a refining tank 3 equipped with a stirring rod 6 for the removal of bubbles and striae, and a working tank 4 equipped with a stirring rod 13 for removing any remaining bubbles and striae. The melting tank 1 and the refining tank 3 are connected to each other by a connecting pipe 2 and the refining tank 3 and the working tank 4 are connected to each other by a connecting pipe 12. The surface level of the molten glass in the refining tank 3 is positioned at a much lower location than the bottom level of the melting tank 1 so that the molten glass in the melting tank 1 can flow into the refining tank 3 without leaving any residue in the melting tank 1. Furthermore, when the length of the connecting pipe 2 in the vertical direction is made sufficiently long the flow rate of the molten glass in the connecting pipe 2 can be easily controlled. Level gauges 7 and 7' are provided inside the refining tank 3 and are connected to a temperature controller 8. A heating-cooling member 9 is located around the connecting pipe 2 for controlling the flow rate of the molten glass. The heating-cooling member is controlled by the temperature controller 8. Electrodes 10 are installed adjacent the bottom of the melting tank 1 to uniformly control the temperature of the molten glass about to be transferred through the connecting pipe 2.

In the operation of the apparatus, a raw material is first fed to the melting tank 1 and is melted to form a molten glass. The molten glass is heated for a sufficient time to allow the refractive index of the molten glass to become uniform. During this procedure the connecting pipe 2 is cooled by means of the heating-cooling member 9 so that the molten glass is solidified in the connecting pipe 2 and does not flow from the melting tank 1 to the refining tank 3. When the introduction of the raw materials ceases, and the homogenization of the refractive index is sufficiently achieved, the connecting pipe 2 is heated by the operation of the heating-cooling member 9 and the molten glass in the melting tank 1 flows into the refining tank 3. Although the surface level of the melting tank 1 changes with a lapse of time thereby causing changes in the pressure, the liquid gauges 7 and 7' detect the surface level of the molten glass in the refining tank 3 to determine when the surface level of the molten glass deviates from a predetermined range. The signal provided by the liquid gauges controls the temperature controller 8 which in turn regulates the temperature of the heating-cooling member 9 to control the flow rate of the molten glass in the connecting pipe and thereby control the surface level of the molten glass in the refining tank. Since the electrodes 10 are installed at the bottom of the melting tank, the temperature inside the melting tank can be maintained at a predetermined level although the surface level of the molten glass changes. The volume of the melting tank is from 5 to 10 times as much as the volume of the refining tank. It is possible to control the change in the refractive index of the glass within the melting tank within a range of $\pm 20 \times 10^{-5}$.

Figure 3:
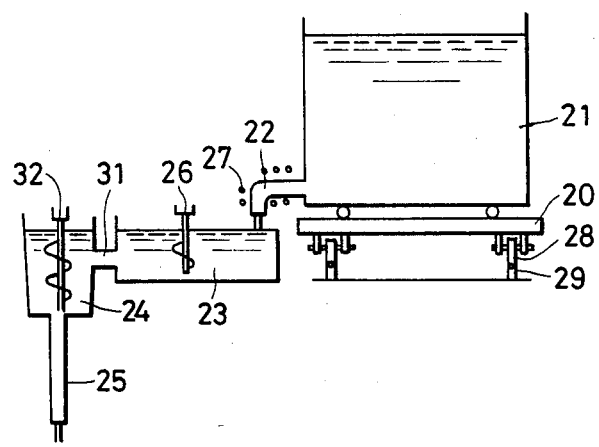
FIG. 3 is a cross-sectional schematic view of a second embodiment of the apparatus for carrying out the method according to the present invention.

In the embodiment of FIG. 3, a melting tank 21a is mounted on truck 20, a refining tank 23 is provided with a stirring means 26 and a working tank 24 is provided with a stirring means 32 and an outlet pipe 25. One end portion of the connecting pipe 22 provided at the lower portion of the melting tank 21a is bent downwardly at a right angle and is open at a point spaced from the surface of the molten glass in the refining tank 23. The connecting pipe 22 is provided with a heating-cooling means 27 so that the flow of molten glass can be stopped and started or the flow rate of the molten glass can be adjusted by regulating the temperature inside the connecting pipe 22 whereby the surface level of the molten glass in the refining tank 23 can be maintained at the desired level. The molten glass in the refining tank 23 flows through a pipe 31 into the working tank 24 where it is stirred by the stirring means 32 and is withdrawn through an outlet pipe 25. The melting tank 21a mounted on the truck 20 is movable in a lateral direction relative to the refining tank 23 by means of wheels 28 and rails 29. A second melting tank 21b which is substantially identical to the melting tank 21a is also freely movable in the lateral direction along the rails 29 on a separate truck 20.

Figure 4:
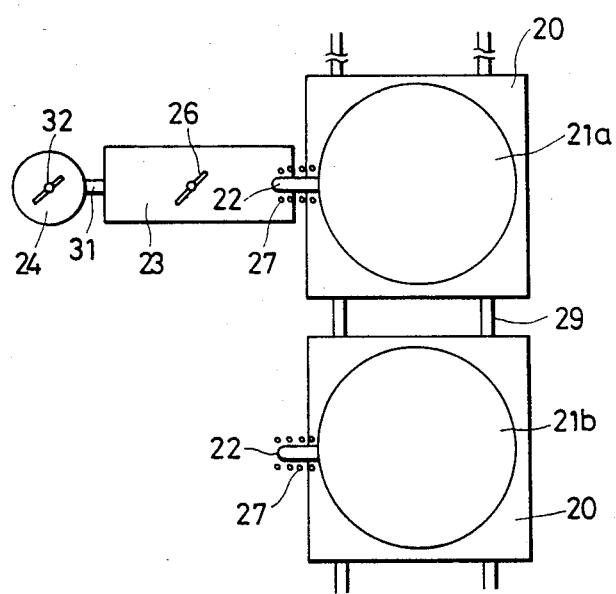
FIG. 4 is a schematic top plan view of the apparatus shown in FIG. 3.

In the operation of the apparatus shown in FIGS. 3 and 4, a raw material is first placed in the melting tank 21a where it is melted and homogenized to provide a uniform refractive index. The molten glass is then transferred to the refining tank 23 where bubbles and striae are removed by means of the stirring means 26. The molten glass is then transferred to the working tank 24 in which it is stirred by means of the stirring means 32 to remove any remaining bubbles and striae. The temperature of the molten glass in the working tank 4 is adjusted to the desired temperature level which will enable the molten glass to flow out of the tank 24 through the outlet pipe 25. The second melting tank 21b containing a previously prepared batch of molten glass having a uniform refractive index is then substituted for the first melting tank 21a. The molten glass in the second melting tank 21b is then dispensed to the refining tank under the control of the heating-cooling means 27 surrounding the connecting pipe 22 while the first melting tank 21a is being used to melt and homogenize a new batch of raw material so as to provide a uniform refractive index. When the melting tank 21b is empty, the tanks can then be exchanged again. While two tanks have been shown and described in the present application, it is obvious that a larger number of tanks may be utilized to increase the efficiency of the operation.

While the invention has been particularly shown and described with reference to preferred embodiments thereof, it will be understood by those in the art that the foregoing and other changes in form and details may be made therein without departing from the spirit and scope of the invention.

What is claimed is:

1. A method of melting glass utilizing a glass melting system comprised of a melting tank a refining tank and a working tank in which the volume of the melting tank is five to ten times larger than the volume of the refining tank and the working tank, comprising melting a single batch of raw material in the melting tank to obtain molten glass having a uniform refractive index, intermittently feeding the molten glass to the refining tank until the melting tank is substantially empty, continuously treating the molten glass supplied to the refining tank and continuously supplying the treated molten glass to the working tank.

2. The method as set forth in claim 1, further comprising controlling the temperature of the molten glass in the melting tank adjacent the bottom thereof by electrode means on the side wall of the tank adjacent the bottom thereof.

3. The method as set forth in claim 1, further comprising controlling the level of the glass in the refining tank which is located at a lower level than the bottom level of the melting tank by controlling the temperature of a heating-cooling means surrounding a pipe connecting the bottom of the melting tank to the refining tank in response to changes in the level of glass in the refining tank.

4. An apparatus for melting glass comprising melting tank means, a refining tank and a working tank, pipe means for intermittently supplying molten glass from said melting tank means to said refining tank and means for continuously supplying molten glass from said refining tank to said working tank, wherein said melting tank means is comprised of a plurality of individual melting tanks each of which is provided with said pipe means and means for selectively moving each of said melting tanks into a discharge position relative to said refining tank for transferring molten glass from a respective tank through its connecting pipe means into said refining tank.

* * * * *